P. GRANT.
HORSE HAY-FORK.
No. 189,095. Patented April 3, 1877.
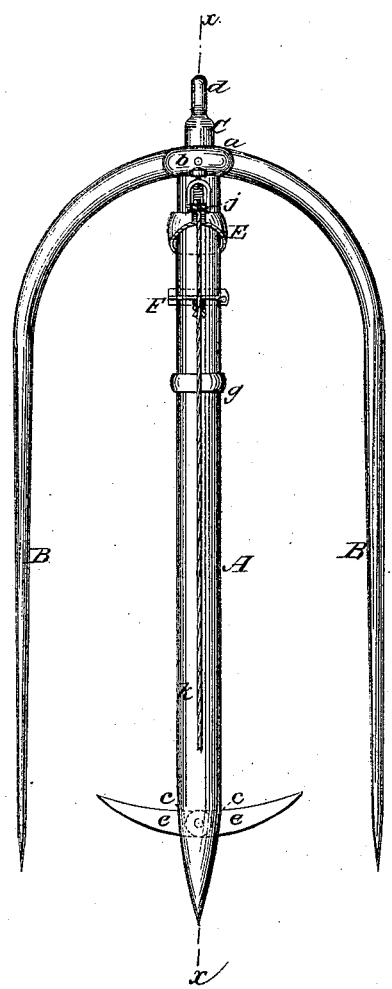
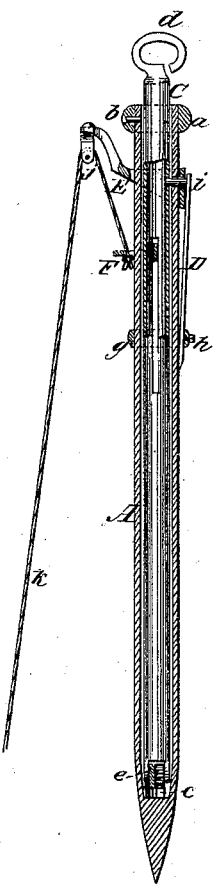

UNITED STATES PATENT OFFICE.

PETER GRANT, OF CLINTON, ONTARIO, ASSIGNOR TO HIMSELF AND JOHN R. GRANT, OF BRUSSELS, CANADA.

IMPROVEMENT IN HORSE HAY-FORKS.

Specification forming part of Letters Patent No. 189,095, dated April 3, 1877; application filed November 11, 1876.

*To all whom it may concern:*

Be it known that I, PETER GRANT, of Clinton, in the Province of Ontario and Dominion of Canada, have invented a new and Improved Horse Hay-Fork, of which the following is a specification:

Figure 1 is a side elevation of my improved fork. Fig. 2 is a central vertical section on line $x\ x$ in Fig. 1.

Similar letters of reference indicate corresponding parts.

My invention relates to the class of forks used for loading and unloading hay and other similar substances by means of horse-power.

The invention will first be described in connection with the drawing, and then pointed out in the claim.

Referring to the drawing, A is the central tubular tine, and B B are the lateral tines. C is a tubular plunger, that fits into the tine A, and is provided at its upper end with the eye or hook $d$, and is plugged at its lower end, and provided with ears, between which the barbs $e$ are pivoted. D is a spring, clamped to the tine A by the band $g$ and screw $h$, and provided with a catch-pin, $i$, which passes through the disengaging-lever E and side of the tine A into a hole in the plunger C. The lever E encircles the tine A, and rests under the spring D, and is held in place by the catch-pin $i$. The free end of this lever is bent upward, and provided with a small pulley, $j$. F is a key, that passes through a mortise in the tine A, and through a slot in the plunger C, for limiting the motion of the said plunger. The end of the key F is bent over the front of the tine A, and formed into an eye for attaching the disengaging-cord $k$, which runs over the pulley $j$.

Having thus described my invention, I claim as new and desire to secure by Letters Patent—

A horse hay-fork provided with a key, F, bent over the front of tine A, and formed into an eye for receiving the disengaging-cord, substantially as shown and described.

PETER GRANT.

Witnesses:
 C. SEDGWICK,
 GEO. M. HOPKINS.